US012623530B2

(12) United States Patent
Imai et al.

(10) Patent No.: US 12,623,530 B2
(45) Date of Patent: May 12, 2026

(54) IN-WHEEL MOTOR

(71) Applicant: TOYOTA JIDOSHA KABUSHIKI KAISHA, Toyota (JP)

(72) Inventors: Keita Imai, Seto (JP); Kiichi Yokoyama, Toyota (JP); Hiroki Monji, Toyota (JP); Yusuke Ueta, Haibara-gun (JP); Tatsuya Sakai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 18/515,552

(22) Filed: Nov. 21, 2023

(65) Prior Publication Data

US 2024/0253446 A1     Aug. 1, 2024

(30) Foreign Application Priority Data

Jan. 30, 2023     (JP) ................................. 2023-012243

(51) Int. Cl.
B60K 7/00          (2006.01)
(52) U.S. Cl.
CPC ..................................... B60K 7/00 (2013.01)
(58) Field of Classification Search
CPC .. B62B 3/02; B62B 3/008; B62B 5/04; B62B 5/06; B62B 2301/22; B62B 3/022; B62B 5/0414; B62B 2203/10; B62D 57/032; B62D 61/10; B62D 57/024; B60K 7/00
USPC ......................................................... 280/651
See application file for complete search history.

(56) References Cited

U.S. PATENT DOCUMENTS

2008/0308330 A1 * 12/2008 Murata ................ B60K 17/043
180/65.51

FOREIGN PATENT DOCUMENTS

| | | |
|---|---|---|
| JP | 2013-055804 A | 3/2013 |
| JP | 2015-194195 A | 11/2015 |

* cited by examiner

*Primary Examiner* — James A Shriver, II
*Assistant Examiner* — Hilary L Johns
(74) *Attorney, Agent, or Firm* — SoraIP, Inc.

(57)          ABSTRACT

An in-wheel motor including: a motor disposed inside a wheel; and a case that accommodates the motor, characterized in that: a lower arm mounting portion to which the case and a lower arm are connected, is included; the lower arm mounting portion is disposed at a position facing a surface of the wheel; and the case includes a drain plug disposed at a position between the surface of the wheel and the lower arm mounting portion.

7 Claims, 1 Drawing Sheet

IN-WHEEL MOTOR

CROSS-REFERENCE TO RELATED APPLICATION

This application claims priority to Japanese Patent Application No. 2023-012243 filed on Jan. 30, 2023, incorporated herein by reference in its entirety.

BACKGROUND

1. Technical Field

The present disclosure relates to an in-wheel motor.

2. Description of Related Art

Japanese Unexamined Patent Application Publication No. 2013-055804 (JP 2013-055804 A) discloses a configuration of an in-wheel motor in which a drain plug is provided in a case accommodating the motor, and the drain plug is disposed inside the wheel.

SUMMARY

However, only disposing the drain plug inside the wheel of the in-wheel motor as in the configuration described in JP 2013-055804 A cannot sufficiently suppress damage to the drain plug due to a flying stone.

The present disclosure provides an in-wheel motor that can effectively suppress damage to the drain plug due to a flying stone.

The present disclosure relates to an in-wheel motor including: a motor disposed inside a wheel; and a case that accommodates the motor, characterized in that: a lower arm mounting portion to which the case and a lower arm are connected, is included; the lower arm mounting portion is disposed at a position facing a surface of the wheel; and the case includes a drain plug disposed at a position between the surface of the wheel and the lower arm mounting portion.

According to the configuration, since the drain plug is disposed between the surface of the wheel and the lower arm mounting portion, an exposed area of the drain plug is reduced. Therefore, the damage to the drain plug due to the flying stone can be effectively suppressed.

Further, the drain plug may be provided in a lower portion of the case, may be directed downward in an up-down direction, and may be disposed above the lower arm mounting portion in the up-down direction.

According to this configuration, the drain plug can be disposed at a position where the drain plug is protected from the flying stone by the lower arm mounting portion, and the damage to the drain plug due to the flying stone can be suppressed.

In the present disclosure, since the drain plug is disposed between the surface of the wheel and the lower arm mounting portion, an exposed area of the drain plug is reduced. Therefore, the damage to the drain plug due to the flying stone can be effectively suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An in-wheel motor according to an embodiment of the present disclosure will be specifically described below. The present disclosure is not limited to the embodiments described below.

Figure 1:
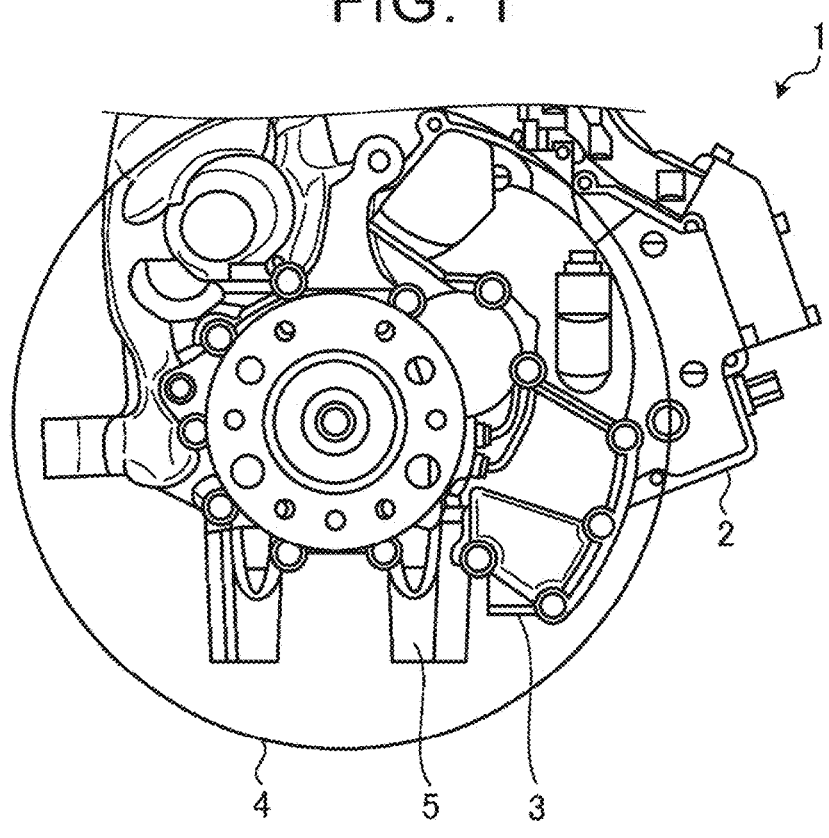
FIG. 1 is a diagram schematically showing an in-wheel motor in an embodiment.

FIG. 1 is a diagram schematically showing an in-wheel motor in an embodiment. The in-wheel motor 1 includes a case 2 that houses the motor, and a drain plug 3 provided at the bottom of the case 2. The in-wheel motor 1 is arranged inside the wheel 4 of the wheel.

The in-wheel motor 1 is mounted on the vehicle as a power source. The in-wheel motor 1 includes a motor that drives wheels and a power transmission device that transmits the power of the motor to the wheels. The motor has a rotor and a stator. The motor is arranged inside the wheel 4. The power transmission device includes a speed reducer that reduces the speed of rotation of the motor and outputs the speed. In the in-wheel motor 1, the power output from the motor is transmitted to the wheels via the speed reducer. The motor and speed reducer are housed inside the case 2. The case 2 contains oil for cooling the motor. This oil functions as cooling oil for the motor and also as lubricating oil for lubricating the speed reducer inside the case 2. The output shaft of the speed reducer is connected to the wheel via an axle hub so as to rotate integrally with the wheel. The axle hub forms the inner ring of the hub bearing. The hub bearing has an inner ring, rolling elements and an outer ring, and the outer ring is fixed to the case 2. The inner ring of the hub bearing is formed by the cylindrical portion of the axle hub. The axle hub is attached to the disk portion of the wheel 4 and rotates integrally with the wheel. Wheel 4 has a disc portion and a rim portion. The axle hub and brake disc are fixed to the disc portion of the wheel 4 by bolting. In the in-wheel motor 1, the output shaft of the speed reducer, the axle hub, the brake disc, and the wheel 4 rotate together. The in-wheel motor 1 has a structure in which a case 2 is arranged inside a wheel 4 of a wheel.

The case 2 is connected to the lower arm and supported by the vehicle body via the suspension. The in-wheel motor 1 includes a lower arm mounting portion 5, which is a portion where the case 2 and the lower arm are connected.

The lower arm mounting portion 5 is a portion integrated with the case 2. That is, the case 2 may be configured including the lower arm mounting portion 5. As shown in FIG. 1, the lower arm mounting portion 5 is arranged below the center of rotation of the wheel 4 in the vertical direction of the vehicle. In the in-wheel motor 1, the drain plug 3 is arranged beside the lower arm mounting portion 5 in the case 2. The lower arm mounting portion 5 is arranged at a position facing the surface of the wheel 4. The case 2 also has a drain plug 3 arranged between the surface of the wheel 4 and the lower arm mounting portion 5.

The drain plug 3 is provided in the lower part of the case 2 and faces downward in the vertical direction. The case 2 is formed with a drain hole serving as an oil flow path. This drain hole is closed by a drain plug 3. The drain plug 3 is a member configured to be attachable/detachable to/from the drain hole. The drain plug 3 can be removed from the drain hole when the oil in the case 2 needs to be replaced due to deterioration of the oil or the like.

Figure 2:
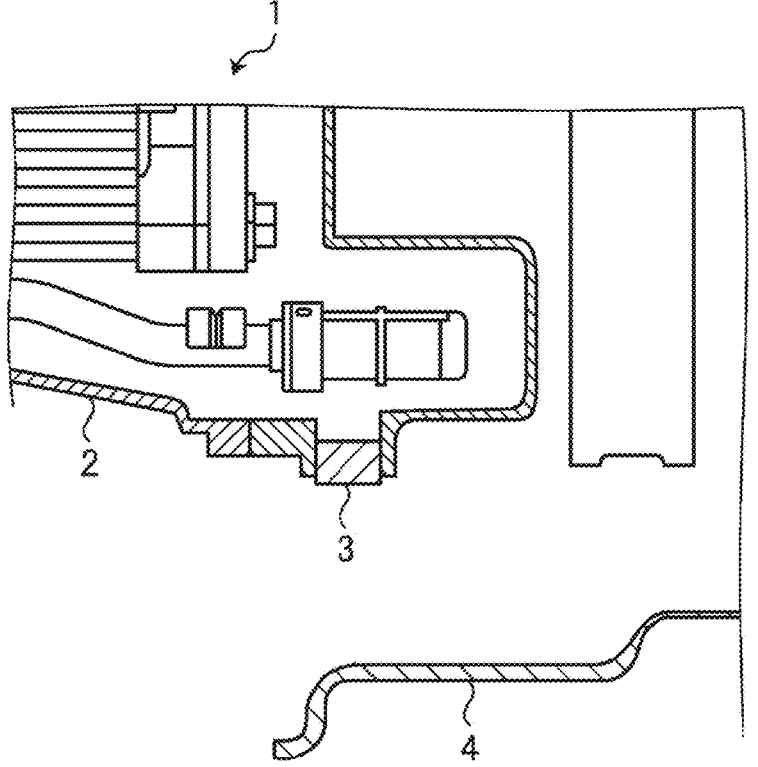
FIG. 2 is a diagram for explaining the arrangement of drain plugs.

As shown in FIG. 1, the drain plug 3 is arranged above the lower arm mounting portion 5 in the vertical direction. Furthermore, the drain plug 3 is arranged in the wheel 4, as shown in FIG. 2. That is, the drain plug 3 is arranged between the case 2 and the wheel 4 in the vertical direction, and is provided between the lower arm mounting portion 5 and the wheel 4 in the width direction. The width direction can be expressed as the width direction of the wheels, the width direction of the vehicle, and the rotation center axis direction of the wheels 4.

As the wheel 4 rotates while the vehicle is running, it is assumed that the stepping stone picked up by the wheel bounces off the inner surface of the wheel house. In the in-wheel motor 1, the lower arm mounting portion 5 is arranged between the inner surface of the wheel house and the drain plug 3 in the width direction. In other words, in the in-wheel motor 1, the drain plug 3 is arranged at a position where the lower arm mounting portion 5 functions as a wall with respect to the inner surface of the wheel house. That is, the drain plug 3 is arranged at a position where the lower arm mounting portion 5 functions as a protective wall against stepping stones.

As described above, since the drain plug 3 is arranged in the wheel 4 at a position protected by the lower arm mounting portion 5, damage to the drain plug 3 due to flying stones can be suppressed. The lower arm mounting portion 5 functions as a protective wall against the drain plug 3, and can suppress collision of stepping stones with the drain plug 3.

What is claimed is:

1. An in-wheel motor comprising:
a motor disposed inside a wheel of a vehicle;
a case that accommodates the motor; and a lower arm mounting portion integrated with the case and connected to a lower arm, wherein
the lower arm mounting portion is disposed at a position facing a surface of the wheel, and
the case includes
a drain hole provided in a bottom wall of the case and opening in an up-down direction of the vehicle, and
a drain plug that closes the drain hole and that is disposed at a position between the surface of the wheel and the lower arm mounting portion.

2. The in-wheel motor according to claim 1, wherein the drain plug is disposed above the lower arm mounting portion in the up-down direction.

3. The in-wheel motor according to claim 1, wherein the case is connected to the lower arm of a suspension via the lower arm mounting portion and supported by a vehicle body of the vehicle via the suspension.

4. The in-wheel motor according to claim 1, wherein the lower arm mounting portion is configured to serve as a protection wall that protects the drain plug from being hit by a stone that has been picked up by the wheel while the vehicle is running.

5. The in-wheel motor according to claim 1, wherein the lower arm mounting portion extends downward in the up-down direction from the case.

6. The in-wheel motor according to claim 1, wherein a lower edge of the lower arm mounting portion is positioned below a lower edge of the drain plug in the up-down direction.

7. The in-wheel motor according to claim 1, wherein the drain plug is arranged beside the lower arm mounting portion in the case.

* * * * *